United States Patent [19]

Petrak et al.

[11] 4,256,352
[45] Mar. 17, 1981

[54] NEEDLE JOURNAL BEARING FOR A MAGNETICALLY SUPPORTED ROTOR SHAFT OF A MEASURING INSTRUMENT

[75] Inventors: Heinz Petrak; Gunther Vieweg; Martin Weinicke, all of Nuremberg, Fed. Rep. of Germany

[73] Assignee: Siemens Aktiengesellschaft, Munich, Fed. Rep. of Germany

[21] Appl. No.: 8,039

[22] Filed: Jan. 31, 1979

[30] Foreign Application Priority Data

Feb. 21, 1978 [DE] Fed. Rep. of Germany ....... 2807339

[51] Int. Cl.³ ............................................. F16C 39/06
[52] U.S. Cl. .................................... 308/10; 308/238; 308/DIG. 8
[58] Field of Search ................... 308/10, 37, 139, 238, 308/DIG. 8

[56] References Cited

U.S. PATENT DOCUMENTS

| | | | |
|---|---|---|---|
| 1,691,039 | 11/1928 | Anderson | 308/238 |
| 3,107,948 | 10/1963 | Lovegrove | 308/10 |
| 3,233,950 | 2/1966 | Baermann | 308/10 |
| 3,370,896 | 2/1968 | Atkins | 308/10 |
| 3,810,683 | 5/1974 | Keever et al. | 308/10 |

FOREIGN PATENT DOCUMENTS

| | | | |
|---|---|---|---|
| 2358225 | 7/1975 | Fed. Rep. of Germany | 308/238 |
| 2506741 | 8/1976 | Fed. Rep. of Germany | 308/10 |
| 74652 | 3/1917 | Switzerland | 308/37 |
| 90510 | 9/1921 | Switzerland | 308/37 |
| 544800 | 5/1942 | United Kingdom | 308/328 |

Primary Examiner—Richard R. Stearns
Attorney, Agent, or Firm—Kenyon & Kenyon

[57] ABSTRACT

A needle bearing for a magnetically supported rotor shaft in a measuring instrument, such as a watt-hour meter, having a thin metal bearing needle projecting into a plastic needle guide having good wear and friction properties is provided in a manner advantageous from a production point of view, while providing high guidance accuracy and good cooling of the structure, by means of a coating on the needle having good sliding properties in the region interacting with the needle guide. The coating takes the form of a sleeve which can be slipped onto the bearing needle and replaced in a most simple manner.

7 Claims, 1 Drawing Figure

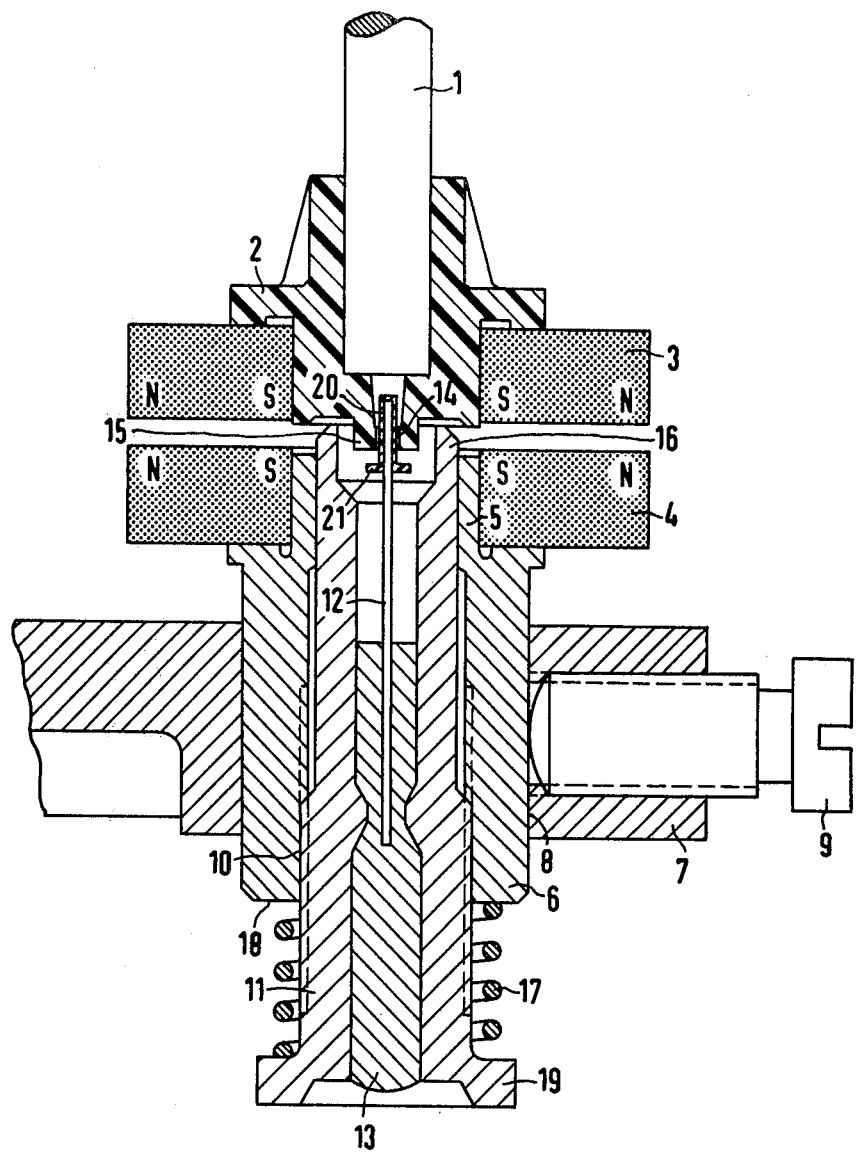

NEEDLE JOURNAL BEARING FOR A MAGNETICALLY SUPPORTED ROTOR SHAFT OF A MEASURING INSTRUMENT

BACKGROUND OF THE INVENTION (a) Field of the Invention

The present invention relates to a needle journal bearing for the magnetically supported rotor shaft of a measuring instrument, such as a watt-hour meter, in which a thin metal bearing needle protrudes into a needle guide of a plastic material having good wear and friction properties.

(b) Description of the Prior Art

Such a needle bearig is described in German Auslegeschrift No. 12 11 054.

In magnetic support bearings, such needle journal bearings serve for the stable lateral guidance of the oppositely disposed pairs of magnet rings. It has been found that the bearing point between the bearing needle and the needle guide is subjected to increased wear which can be explained by the fact that vibration stress of the bearing occurs as well as stress due to rotation.

British Pat. No. 11 43 942 describes a cylindrical clapper and/or hollow cylindrical guide the outside surface of which is provided with PTFE coatings by applying this material in suspension to the surfaces and solidifying them at elevated temperature.

British Pat. No. 536 972 describes a sub-bearing for measuring instruments with a rotatable shaft in which the bearing bushing and the bearing pin are made of plastic and are connected to the shaft. The bearing pin is either fastened to the shaft at its end by means of a metal sleeve or can be pushed onto the shaft itself. The shaft is then supported and guided by the solid plastic bearing pin in this structure.

In the journal "Feinwektechnik", vol. 59.1955, no. 1, pages 10 to 15, the subject "Polyamides as structural materials in precision engineering" is discussed. Here, in connection with the rapid removal of friction heat, it is said that it is possible to melt a thin layer of polyamide onto a steel shaft. Preference is indicated for the use of the pair metal/polyamide as bearing materials. Melting polyamide onto metal with the high precision required for needle bearings is an expensive manufacturing process. In addition, the entire bearing element must be replaced if the polyamide coating on a bearing element is worn.

It is an object of the present invention to provide a needle journal bearing of the type mentioned above which makes it possible to support the rotor shaft with low friction and wear in a manner advantageous from a production point of view, while at the same time the accuracy of the guidance and good cooling of the bearing are to be preserved.

SUMMARY OF THE INVENTION

According to the invention, this problem is solved by providing the bearing needle, at least in the region cooperating with the needle guide, with a coating having good sliding properties, the coating being realized as a sleeve that can be slipped onto the bearing needle. It is thereby readily possible to apply and replace the coating at any time after the coating is worn without the need to replace the entire bearing needle. The stability and accuracy of guidance is ensured by the metallic bearing needle which is located as the core in the slip-on sleeve. The friction heat produced in the bearing is removed reliably and quickly by the metallic bearing needle.

In a preferred embodiment, the sleeve has a collar which facilitates mounting and provides increased pressure of the sleeve onto the bearing needle in the vicinity of the collar.

The sleeve is made of plastic, providing a plastic to plastic pairing of the sliding surfaces which develops particularly good damping properties in view of the vibration stress occurring in needle journal bearings of this type.

The needle guide consists preferably of polyoxymethylene and the sleeve of polyamide. This pairing of materials exhibits particularly good sliding properties.

Ease of manufacturing is assured by making the needle guide a bore hole in a plastic hub which is connected to the end of the rotor shaft and carries a ring magnet.

In a preferred embodiment, the hole is made in a cylindrical extension of the plastic hub. This provides, in a structure which is simple and easy to make in production, sufficient distance between the rotor shaft and the end of the bearing needle.

In order to protect the bearing needle against bending due to transport shocks, the cylindrical extension is extended into the interior of a collar on the needle bushing. This provides a lateral stop which protects the bearing needle if large forces perpendicular to the lengthwise extension of the bearing needle occur.

BRIEF DESCRIPTION OF THE DRAWING

The sole FIGURE is a view in cross-section of a needle journal bearing made in accordance with the teachings of the invention.

DETAILED DESCRIPTION OF THE INVENTION

Rotor shaft 1 carries on its lower end a hub 2 of thermoplastic material on which a ring magnet 3 is arranged. This magnet is radially magnetized as indicated in the drawing.

Magnet 3 cooperates with ring magnet 4 which is fastened at the upper end 5 of guide sleeve 6 and which is magnetized in the same way. Guide sleeve 6 is fastened in a bore hole 8 in measuring mechanism support 7 and can be adjusted in height, being maintained in position by means of a screw 9. The interior of guidance bushing 6 is provided with a thread 10 for use in introducing needle sleeve 11 into the hole of sleeve 6. Bearing needle 12 is axially positioned in a hole of needle bushing 11 and is maintained in position by cast material 13. Bearing needle 12 extends up into hole 14 of a cylindrical extension 15 of thermoplastic hub 2 which is designed as a needle guide. The hub therefore functions at the same time as a needle guide. The hub is preferably made of a plastic material with good bearing properties such as polyoxymethylene.

The cylindrical extension 15 of the hub 2 extends into the interior of axially projecting collar 16 of needle sleeve 11 which provides protection of bearing needle 12 against bending due to transport shocks.

A compression spring 17 is inserted between guidance bushing 6 and needle sleeve 11 which is braced on the one hand against the end face of guidance sleeve 6 and, on the other hand, against a laterally projecting head 19 of the needle bushing 11.

It is a feature of the invention that the steel bearing needle is provided, in the region of the bearing point, with a plastic covering consisting of plastic sleeve 20. This sleeve has the shape of a cup, so that downward displacement of the sleeve 20 is stopped by the bottom of the cup. Sleeve 20 also has a collar 21 which increases the strength of the fit of sleeve 20 on needle 12 and also facilitates mounting of sleeve 20 on the needle.

What is claimed is:

1. A needle journal bearing for a magnetically supported rotor shaft of a measuring instrument, such as a watt-hour meter, comprising a thin metal bearing needle protruding into a needle guide made of polyoxymethylene, the bearing needle being provided, at least in the region interacting with the needle guide, with a covering in the form of a sleeve of polyamide which is slipped onto the needle.

2. A needle journal in accordance with claim 1 in which the sleeve extends along the needle, out of the needle guide, and further comprising a collar on the sleeve at a distance from the needle guide.

3. A needle journal bearing in accordance with claim 1 further comprising the needle guide being a bore hole in a plastic hub which is connected to the end of the rotor shaft and carries a ring magnet.

4. A needle journal bearing in accordance with claim 3 further comprising the bore hole being located in a cylindrical extension of the plastic hub.

5. A needle journal bearing in accordance with claim 4 further comprising the cylindrical extension extending into the interior of a collar of a needle bushing.

6. A needle journal bearing for a magnetically supported rotor shaft of a measuring instrument comprising:
a thin metal bearing needle supported in a needle bushing;
a collar extending concentrically around the needle from an endface of the bushing;
a replaceable plastic sleeve covering the needle and protruding therewith into a needle guide made of plastic, the plastics of the sleeve and the needle guide being chosen to provide low friction and wear between the respective surfaces in sliding engagement;
the needle guide comprising a hole in a cylindrical extension of a plastic hub fastened to the end of the rotor shaft and to a concentric ring magnet and the cylindrical extension protruding into the collar on the endface of the needle bushing; and
a collar spaced apart from the needle guide on the replaceable plastic sleeve.

7. The needle journal bearing of claim 6 which the needle guide is made of polyoxymethylene and the sleeve is made of polyamide.

* * * * *